US009548945B2

(12) United States Patent
Tran et al.

(10) Patent No.: US 9,548,945 B2
(45) Date of Patent: Jan. 17, 2017

(54) MATRIX OF ON-CHIP ROUTERS INTERCONNECTING A PLURALITY OF PROCESSING ENGINES AND A METHOD OF ROUTING USING THEREOF

(71) Applicant: CAVIUM, INC., San Jose, CA (US)

(72) Inventors: Anh T. Tran, Santa Clara, CA (US); Gerald Schmidt, San Jose, CA (US); Tsahi Daniel, Palo Alto, CA (US); Nimalan Siva, San Ramon, CA (US)

(73) Assignee: Cavium, Inc., San Jose, CA (US)

( * ) Notice: Subject to any disclaimer, the term of this patent is extended or adjusted under 35 U.S.C. 154(b) by 0 days.

(21) Appl. No.: 14/142,497

(22) Filed: Dec. 27, 2013

(65) Prior Publication Data

US 2015/0188848 A1 Jul. 2, 2015

(51) Int. Cl.
  *G06F 15/16* (2006.01)
  *H04L 12/937* (2013.01)
  *H04L 12/933* (2013.01)
  *H04L 12/18* (2006.01)
  *H04L 12/935* (2013.01)

(52) U.S. Cl.
  CPC .......... *H04L 49/254* (2013.01); *H04L 12/18* (2013.01); *H04L 49/101* (2013.01); *H04L 49/109* (2013.01); *H04L 49/15* (2013.01); *H04L 49/3018* (2013.01)

(58) Field of Classification Search
  CPC ..................................................... H04L 12/56
  USPC .......................................................... 370/390
  See application file for complete search history.

(56) References Cited

U.S. PATENT DOCUMENTS

| 4,929,939 | A | 5/1990 | Varma |
| 5,319,347 | A | 6/1994 | McClure |
| 6,667,984 | B1* | 12/2003 | Chao et al. ............ 370/414 |
| 7,461,167 | B1* | 12/2008 | Park ........................ 709/240 |
| 8,054,744 | B1 | 11/2011 | Bishara et al. |
| 9,159,420 | B1 | 10/2015 | Wohlgemuth |
| 2002/0009076 | A1 | 1/2002 | Engbersen |
| 2005/0076228 | A1 | 4/2005 | Davis |
| 2006/0059269 | A1* | 3/2006 | Chen et al. ............ 709/235 |
| 2013/0163475 | A1 | 6/2013 | Beliveau |

(Continued)

FOREIGN PATENT DOCUMENTS

EP 1553738 A1 7/2005

OTHER PUBLICATIONS

Altera, "White Paper" Jul. 2006, pp. 1-9.

(Continued)

*Primary Examiner* — Wei Zhao
(74) *Attorney, Agent, or Firm* — Haverstock & Owens LLP

(57) ABSTRACT

Embodiments of the present invention relate to a scalable interconnection scheme of multiple processing engines on a single chip using on-chip configurable routers. The interconnection scheme supports unicast and multicast routing of data packets communicated by the processing engines. Each on-chip configurable router includes routing tables that are programmable by software, and is configured to correctly deliver incoming data packets to its output ports in a fair and deadlock-free manner. In particular, each output port of the on-chip configurable routers includes an output port arbiter to avoid deadlocks when there are contentions at output ports of the on-chip configurable routers and to guarantee fairness in delivery among transferred data packets.

27 Claims, 9 Drawing Sheets

(56) References Cited

U.S. PATENT DOCUMENTS

2014/0153443 A1 6/2014 Carter
2014/0241353 A1 8/2014 Zhang
2015/0156288 A1 6/2015 Lu

OTHER PUBLICATIONS

Bosshart, Pat, "Forwarding Metamorphis: Fast Programmable Match-Action Processing in Hardware for SDN", Aug. 12, 2013, ACM, pp. 99-109.
Price, Charles, "MIPS IV Instruction Set", Sep. 1995, MIPS, pp. A-28-A-29 & A-105-A-106.

* cited by examiner

| UC Dst. Addr. (Decimal Radix) | Output Port ID (Decimal Radix) |
|---|---|
| 0 | 3 |
| 1 | 0 |
| 2 | 7 |
| ... | ... |
| 30 | 0 |
| 31 | 4 |

Fig. 6A

| MC Group ID (Decimal Radix) | Output Port Mask (Binary Radix) |
|---|---|
| 0 | 00101000 |
| 1 | 00001111 |
| 2 | 11000000 |
| ... | ... |
| 30 | 00111000 |
| 31 | 10011011 |

Fig. 6B

MATRIX OF ON-CHIP ROUTERS INTERCONNECTING A PLURALITY OF PROCESSING ENGINES AND A METHOD OF ROUTING USING THEREOF

FIELD OF INVENTION

The present invention relates to the transfer of data packets among multiple processing engines on a single chip. More particularly, the present invention relates to a matrix of on-chip routers interconnecting a plurality of processing engines and a method of routing using thereof.

BACKGROUND OF THE INVENTION

As transistor size becomes smaller, more computational components, memories and processing engines can be integrated onto a single chip. This high integration allows for the ability to process more system tasks in parallel to achieve higher system performance.

These computational components, memories and processing engines require a communication fabric for transferring data among them. As the number of processing engines increases, interconnection techniques, such as bus and ring architectures, are no longer scalable to provide enough communication bandwidth for these engines.

On-chip network is an interconnection technique for a large number of processing engines on a single chip. The network includes multiple on-chip routers in which each on-chip router connects to the nearest neighboring on-chip router(s) in the network. Each processing engine is connected to one of the on-chip routers; and, an on-chip router can connect with multiple processing engines. Data communicated among processing engines are transferred through the network of the on-chip routers.

However, there are issues with the on-chip routers of the prior art. For example, the prior art on-chip routers have fixed routing algorithms. As such, the prior art on-chip routers stop working if the addresses of processing engines change or if more processing engines are added or removed from the network. In addition, these prior art on-chip routers only support unicast data packets among processing engines and fixed arbitration schemes.

BRIEF SUMMARY OF THE INVENTION

An interconnection scheme for multiple processing engines on a single chip is scalable and includes an on-chip network of configurable routers for connecting the multiple processing engines. The network is flexible and scalable for connecting more or less processing engines as required by applications running on the chip utilizing the network. The on-chip routers are reconfigurable to adapt to changes in the network topology and addresses of the processing engines. Data packets communicated among the processing engines are defined in a format which can support both unicast and multicast routing mechanisms. Each on-chip router supports both table-based unicast and multicast data packets using a fair and deadlock-free arbitration scheme. The fair and deadlock-free arbitration scheme allows the on-chip router to guarantee correct delivery of incoming data packets to its output ports in a fair and deadlock-free manner. For multicast data packets, each on-chip router provides two reconfigurable modes for forwarding the data packets to correct desired output ports. One mode is sending a copy upon receiving a grant even if an input port has not heard from all desired output ports, and another mode is waiting to receive all grants from all desired output ports before sending copies to all of the desired output ports at the same time. Routing tables in each on-chip router are programmable by software.

In one aspect, a chip is provided. The chip includes a network. The network typically includes a plurality of processing engines, and a matrix of on-chip routers. Each of the on-chip routers is communicatively coupled with a distinct group of the processing engines and with on-chip routers nearest to that on-chip router in the matrix of on-chip routers. The plurality of processing engines communicates together through the matrix of on-chip routers. In some embodiments, the on-chip routers are configurable by software.

Each of the on-chip routers includes input ports, output ports, and an output port arbiter at each of the output ports. The output port arbiter uses a global grant vector shared by all output port arbiters of that on-chip router and a local grant vector unique to that output port arbiter to grant a query request from one of the input ports.

In some embodiments, the network is scalable to support additional processing engines. For example, the additional processing engines can be coupled with the plurality of on-chip routers. For another example, additional on-chip routers can be added to the matrix, and the additional processing engines are coupled with the additional on-chip routers.

In some embodiments, a link connecting two on-chip routers are multiple times wider than a link connecting an on-chip router and a processing engine such that a router-to-router link can transfer multiple data packets in parallel for reducing network congestion.

In some embodiments, on-chip routers located at an edge of the network are able to connect to components outside the network for simplifying a wiring physical layout of the network.

In another aspect, an on-chip router is provided. The on-chip router includes M input ports, N output ports and a crossbar for connecting the M input ports and the N outputs.

Each of the M input ports typically includes an input queue for storing incoming data packets received from an upstream on-chip router or a processing engine connecting with that input port, a routing block for identifying at least one desired output port of a data packet at the head of the input queue, and a forwarding control block for sending a query request to and receives a grant from each of the at least one desired output port, and forwards the data packet to each of the at least one desired output port.

Each of the N output ports includes an output port arbiter for collecting query requests to that output port from at least one input port and for granting one of the query requests.

The crossbar is controlled by outcomes of the output port arbiters. In some embodiments, the crossbar includes a set of N of M-input multiplexors where M and N are the number of input and output ports of the on-chip router, respectively. Each M-input multiplexor is a binary tree of M−1 of common 2-input multiplexors and has a latency of $\log_2(M)$ times of the latency of a 2-input multiplexor.

In some embodiments, the data packet includes control bits indicating whether the data packet is one of a unicast packet and a multicast packet.

In some embodiments, the on-chip router further includes reconfigurable unicast and multicast routing tables for identifying one or more desired output ports of a data packet. Each of the M input ports is configured to have its own unicast and multicast routing tables. Alternatively, the M input ports are configured to share the routing tables.

In some embodiments, the on-chip router implements one of two configurable modes for forwarding multicast data packets from input ports to output ports.

The output port arbiter is configured to arbitrate a grant for multiple query requests to that output port for multicast and unicast data packets from one or more of the M input ports. In some embodiments, the output port arbiter uses a global_priority_vector variable that is shared by all output port arbiters, a local_priority_vector variable that is maintained by each output port arbiter, and a priority_vector variable that is also maintained by each output port arbiter. The global_priority_vector variable is for allocating a grant among multicast data packets. The local_priority_vector variable is for allocating a grant among unicast data packets. The priority_vector variable is dynamically assigned a value of one of the global_priority_vector and local_priority_vector.

In some embodiments, value assignment for the priority_vector value of each output port arbiter depends on a forwarding mode and whether that output port arbiter has received a query request from any multicast data packet. Each output port arbiter gives grant to only one query requests based on the corresponding priority_vector value.

In some embodiments, the shared global_priority_vector variable and all local_priority_vector variables are updated after each cycle based on granting outcomes so that all data packets always have chances to get granted and deadlock freedom is guaranteed.

In yet another aspect, a method implemented on an on-chip router is provided. A global_priority_vector variable that is shared by all N output port arbiters of the on-chip router is initialized to give priority to one of a plurality of input ports. The global_priority_vector variable is typically for allocating a grant among multicast data packets. Each of N local_priority_vector variables that are maintained by the N output port arbiters is initialized to one of the plurality of input ports. Each of the N local_priority_vector variables is typically for allocating a grant among unicast data packets. A forwarding mode is then determined. In some embodiments, the forwarding mode is reconfigurable by software.

At each of the N output port arbiters, it is determined whether a query request is from a multicast data packet. Based on the determination that the forwarding mode is a first mode or on the determination that the query request is not from a multicast data packet, a value of a priority_vector is set to the value of the local_priority_vector. Based on the determination that the forwarding mode is a second mode and on the determination that the query request is from a multicast data packet, a value of a priority_vector is set to the value of the global_priority_vector. Upon availability of a corresponding output port, grant is sent to an input port based on the priority_vector The global_priority_vector variable and the N local_priority_vector variables are then updated.

In some embodiments, the global_priority_vector variable is not updated when the forwarding mode is the first mode or there is no input port getting granted. Instead, the global_priority_vector variable is updated to an input port with the next highest priority when the forwarding mode is the second mode and there is at least one input port getting granted.

In some embodiments, a local_priority_vector variable is not updated when the corresponding output port arbiter receives at least one query request from a multicast data packet or no grant is sent. Instead, a local_priority_vector variable is updated when the corresponding output port arbiter receives no query requests from any multicast data packet and a grant is sent.

In some embodiments, the first mode is sending a copy upon receiving a grant even if an input port has not heard from all desired output ports, and the second mode is waiting to receive all grants from all desired output ports before sending copies to all of the desired output ports at the same time.

BRIEF DESCRIPTION OF THE DRAWINGS

FIGS. 6A-6B illustrate exemplary configurable unicast (6A) and multicast (6B) routing tables in an on-chip router according to an embodiment of the present invention.

Figure 1:
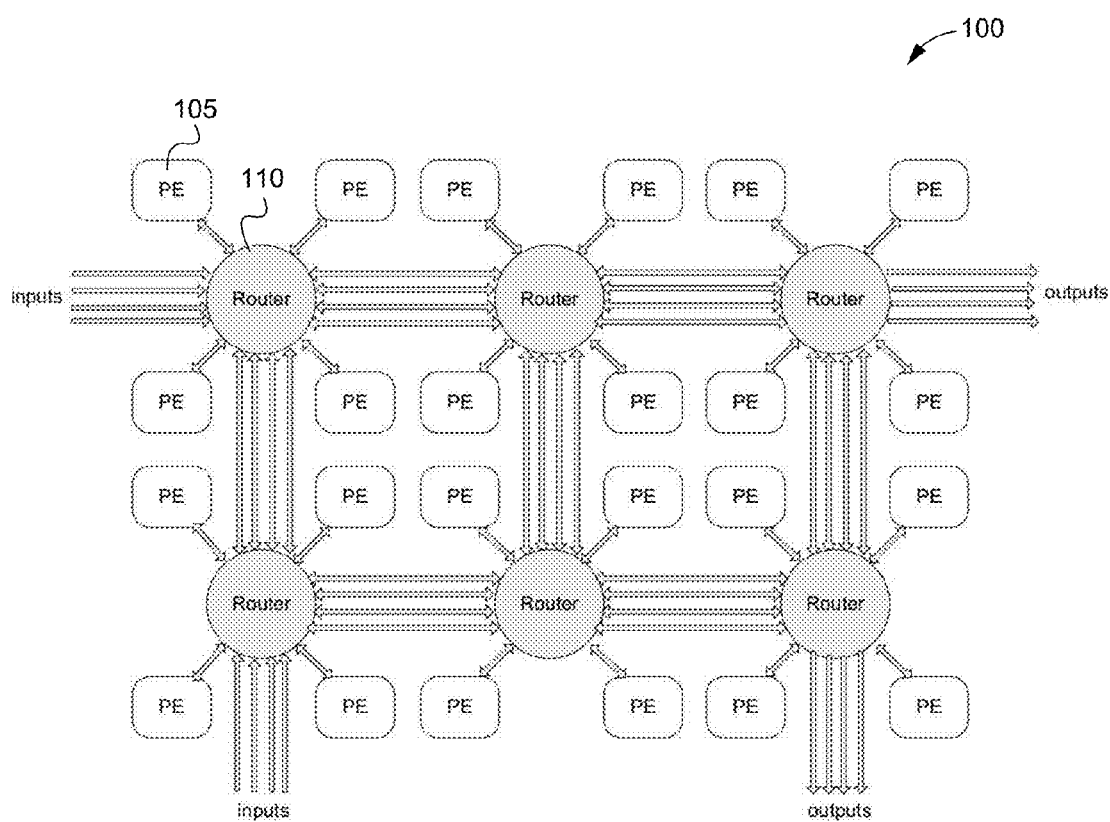
FIG. 1 illustrates a block diagram of a scalable network of configurable on-chip routers for connecting multiple processing engines (PEs) in a single chip according to an embodiment of the present invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

A scalable interconnection scheme for multiple processing engines on a single chip is scalable and includes an on-chip network of configurable routers for connecting the multiple processing engines. The network is flexible and scalable for connecting more or less processing engines as required by applications running on the chip utilizing the network. The on-chip routers are reconfigurable to adapt to changes in the network topology and addresses of the processing engines. Data packets communicated among the processing engines are defined in a format which can support both unicast and multicast routing mechanisms. Each on-chip router supports both table-based unicast and multicast data packets using a fair and deadlock-free arbitration scheme. The fair and deadlock-free arbitration scheme allows the on-chip router to guarantee correct delivery of incoming data packets to its output ports in a fair and deadlock-free manner. For multicast data packets, each on-chip router provides two reconfigurable modes for forwarding the data packets to correct desired output ports. One mode is sending a copy upon receiving a grant even if an input port has not heard from all desired output ports, and another mode is waiting to receive all grants from all desired output ports before sending copies to all of the desired output ports at the same time. Routing tables in each on-chip router are programmable by software.

FIG. 1 illustrates a block diagram of a scalable network 100 of configurable on-chip routers 110 for connecting multiple processing engines (PEs) 105 in a single chip according to an embodiment of the present invention. In FIG. 1, each on-chip router 110 is connected with four PEs 105; however, an on-chip router can connect with more or less PEs depending on application requirements, such as an area budget of the on-chip router. Each on-chip router 110 is also connected with other on-chip routers 100 to form the network 100. Although FIG. 1 illustrates each on-chip router 110 connecting to four nearest-neighboring on-chip routers 110 to form a 2-D mesh network, the number of nearest-neighboring on-chip routers connected with an on-chip router 110 can be different for supporting different network topologies. For example, a 2-D mesh network can be upgraded to a 3-D mesh network by connecting each on-chip router on a middle layer with nearest routers on a top and/or bottom layer in a 3-D through-silicon-via based IC technology.

The network is flexible and easily scalable as the number of processing engines can change. To support a larger number of processing engines on a chip, each on-chip router can be connected with more processing engines, additional on-chip routers can be added to the network, or both.

To reduce data congestion in the network at router-to-router links, a router-to-router link can be wider than a router-to-PE link. As illustrated in FIG. 1, router-to-router links are four times wider than router-to-PE links so that each router-to-router link can carry four data packets in parallel. Alternatively, instead of using wider links, each router-to-router link can be multiple parallel lanes wherein each lane is independent. This alternative is analogous to multiple lanes on a street which allows multiple cars to drive simultaneously.

Processing engines 105 inside the network 100 are able to communicate with other engines/blocks outside the network 100 through input and output ports of the on-chip routers 110 at the edge of the network 100 as illustrated in FIG. 1. This configuration eases the wiring physical layout for the network in the chip.

Each on-chip router 110 receives input data packets from input ports and forwards these data packets to correct output ports. Rather than using a deterministic routing algorithm at the on-chip routers 110, each on-chip router 110 in the network 100 is equipped with configurable routing tables, which can be reprogrammable by software for adapting to network topology or addressing changes, for avoiding deadlock, and/or for reducing contention at output ports.

Figure 2:
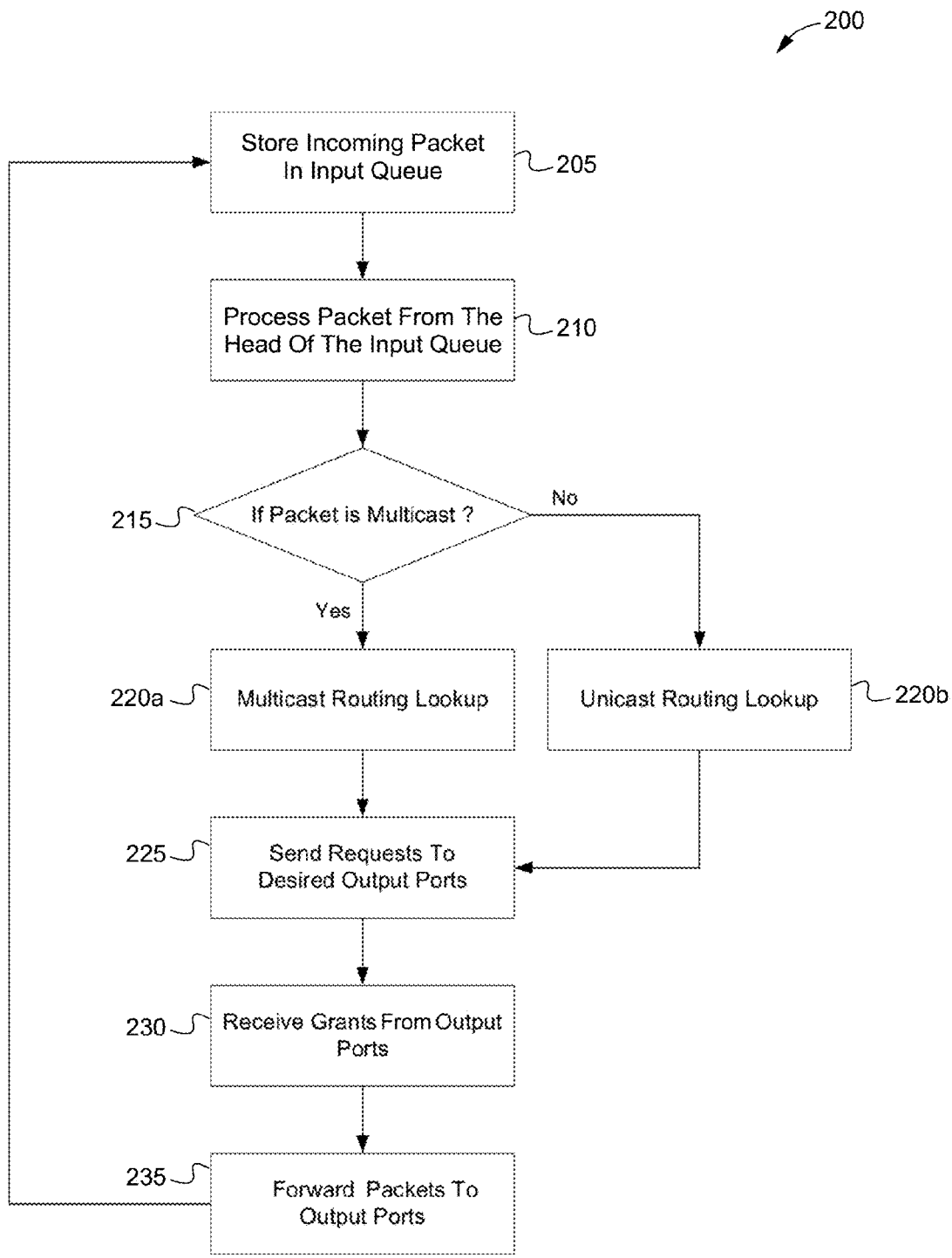
FIG. 2 illustrates a method of processing data packets at each input port of an on-chip router according to an embodiment of the present invention.

FIG. 2 illustrates a method 200 of processing data packets at each input port of an on-chip router according to an embodiment of the present invention. The method 200 begins at a step 205. An input port waits until it receives an incoming data packet. The incoming data packet can arrive from a local PE or an upstream on-chip router that connects with this input port. At the step 205, the incoming data packet is stored in an input queue of the input port. In some embodiments, the input queue is a FIFO queue. If the input queue is full, the source of the data packet (i.e., either the PE or the upstream on-chip router) is notified to stop sending new data packets.

If the input queue is not empty, at a step 210, the data packet at the head of the input queue is processed for forwarding. At a step 215, the data packet is checked whether it is a multicast or a unicast data packet. Depending on the data packet type (i.e., multicast or unicast), the input port will look up a corresponding multicast or unicast table to find out which output port(s) the data packet must go out to. If the data packet is a multicast data packet, at a step 220a, a multicast routing lookup is performed using a multicast routing table. Alternatively, if the data packet is a unicast data packet, at a step 220b, a unicast routing lookup is performed using a unicast routing table. Multicast routing and unicast routing are discussed in detail below.

After the input port learns the desired output port list of the data packet, at a step 225, a query request is sent to each of the desired output port(s) in the list to check whether that output port can accept its data packet.

The input port waits to receive grant(s) from the output port(s) before processing to forward copy(ies) of the data packet to the output port(s) at a step 235. At a step 230, grant(s) is/are received from the output port(s). At a step 235, copy(ies) of the data packet is/are sent or forwarded to the output port(s). As discussed elsewhere, in some embodiments, there are two modes for forwarding a multicast data packet. After the step 235, the method 200 returns to the step 205.

Figure 3:
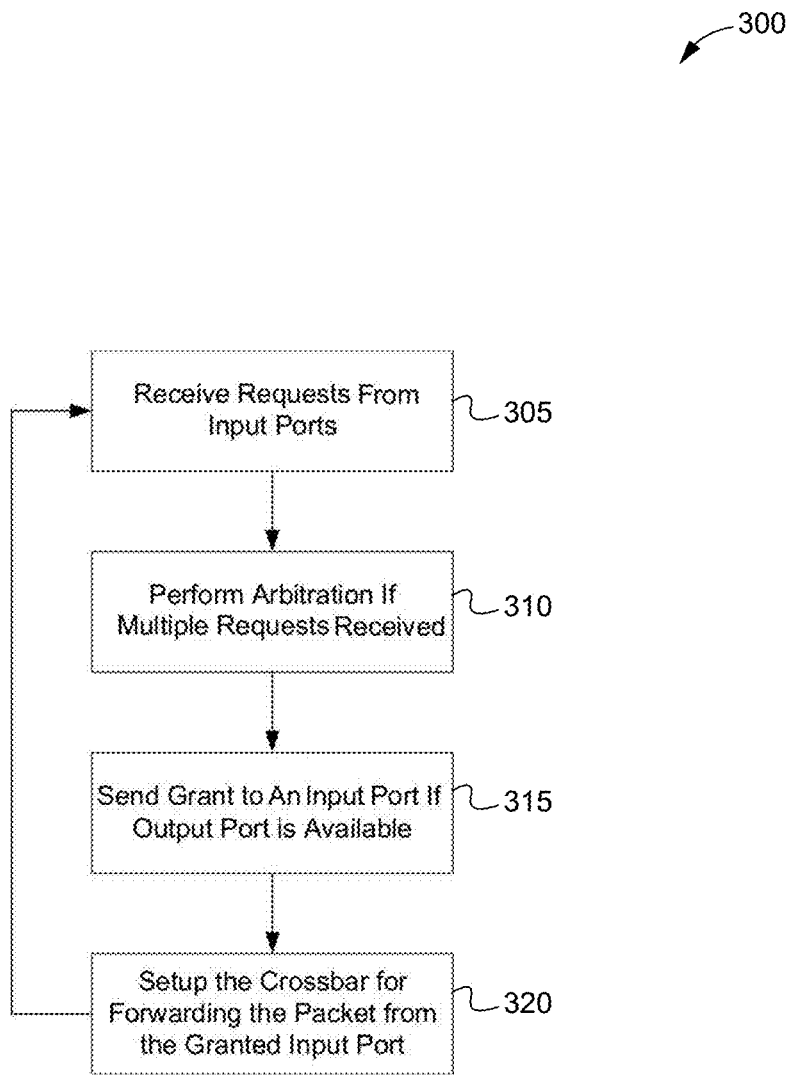
FIG. 3 illustrates a method of processing data packets at each output port of an on-chip router according to an embodiment of the present invention.

FIG. 3 illustrates a method 300 of processing data packets at each output port of an on-chip router according to an embodiment of the present invention. The method 300 begins at a step 305. An output port waits to receive query requests from the input ports.

Since each output port can receive multiple query requests from different input ports that want to send data packets to that output port, each output port is equipped with an output port arbiter to handle granting these query requests. At a step 310, arbitration is performed if multiple query requests are received at that (same) output port. The arbitration is preferably fair (e.g., the priority for each query request is updated at each cycle so that when a request gets granted at the current cycle, it will have the lowest priority in next cycle) and deadlock-free (e.g., there is always an input port among requesting input ports getting granted to be forwarded in each cycle).

At a step 315, a grant is given or sent to one of the input ports that have sent a query request to that output port.

At a step 320, a crossbar is set up so that the corresponding or granted input port can send the data packet to the correct output port(s). After the step 320, the method 300 returns to the step 305.

Figure 4:
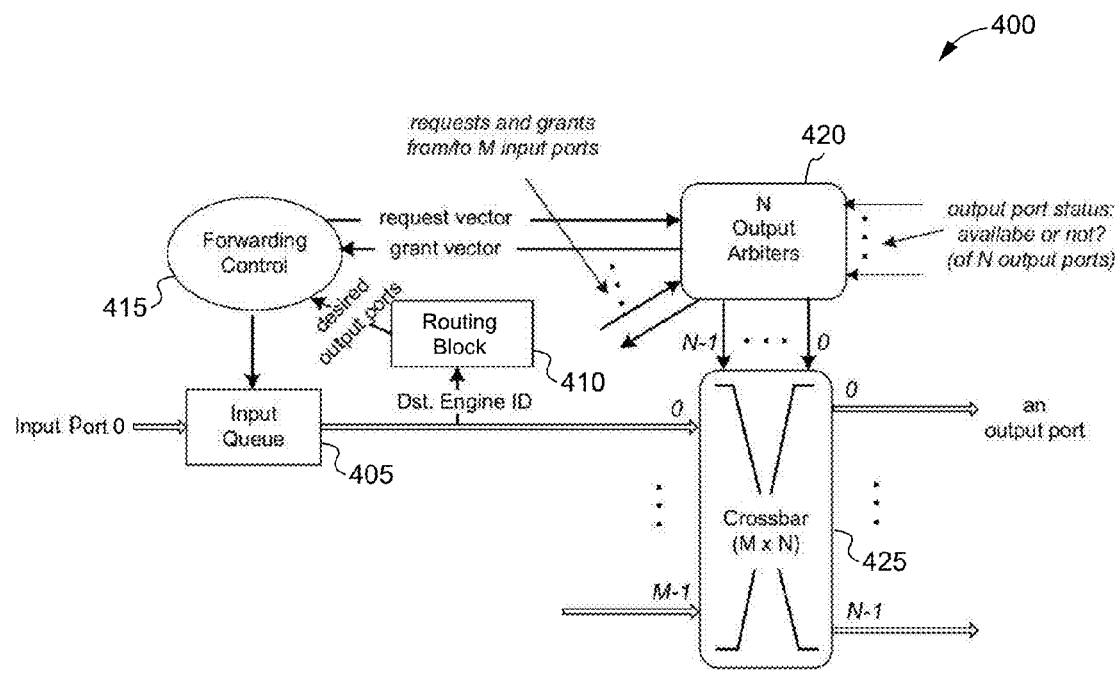
FIG. 4 illustrates a block diagram of an on-chip router according to an embodiment of the present invention.

FIG. 4 illustrates a block diagram of an on-chip router 400 according to an embodiment of the present invention. The on-chip router discussed in FIG. 1 is similarly configured as the on-chip router 400. The on-chip router 400 has M input ports and N output ports, wherein M and N depend on the network topology. Each input port has an input queue 405 to store incoming data packets to that input port. At a routing block 410, the input port checks whether a data packet at the head of the input queue is multicast or unicast based on a "Destination Engine ID" field in the data packet and then looks up the data packet's desired output ports from reconfigurable routing tables in the on-chip router.

A forwarding control block 415 sends query requests to and receives grants from the desired output ports and then performs copying the data packet (in case of multicast) and forwarding to granted output port(s). There are N output port arbiters 420, each per output port of the N output ports. Each output port arbiter 420 handles arbitration for all query requests to its corresponding output port. Grant signals from these output port arbiters are used to setup the crossbar 425 for forwarding data packets from the input ports to their correct output ports. The crossbar 425 has M input ports and N output ports that correspond with the number of input and output ports of the on-chip router. Each of the forwarding control block 415, the output port arbiters 420 and the crossbar 425 is further discussed in detail below.

Figure 5:
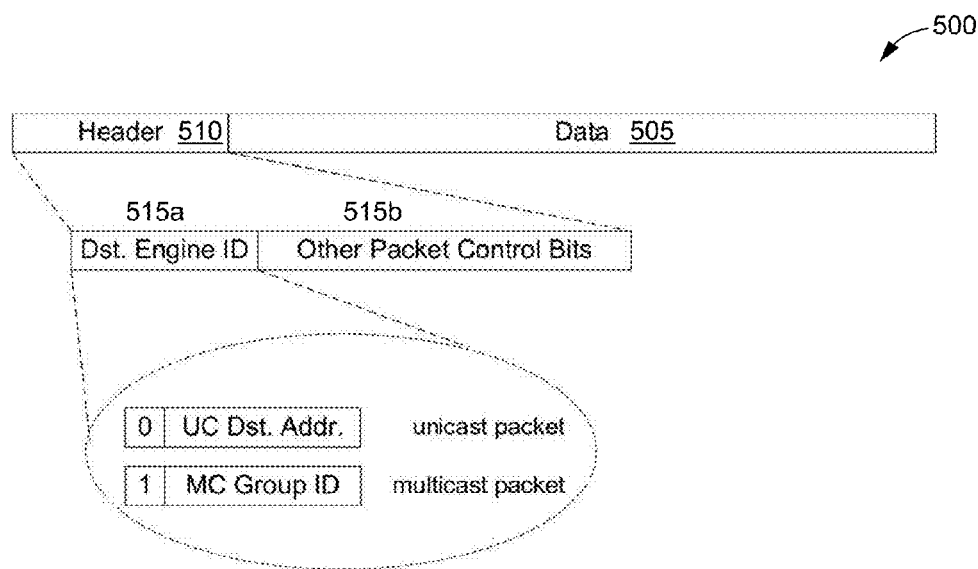
FIG. 5 illustrates a format of a data packet according to an embodiment of the present invention.

FIG. 5 illustrates a format of a data packet 500 according to an embodiment of the present invention. The data packet 500 includes the data portion 505, which is transferred between sending and receiving engines. The data packet 500 also includes a header portion 510, which contains control bits 515*a*, 515*b* (collectively 515) used to route the data packet 500 in a network. In the header portion 510, a "Destination Engine ID" field is checked by an on-chip router. Assume the "Destination Engine ID" field has n bits. In some embodiments, "0" in the most significant bit (i.e., the bit at position n−1 in n bits) indicates that the data packet is unicast, and "1" in the most significant bit indicates that the data packet is multicast.

For a unicast data packet, the value of n−1 least significant bits in the "Destination Engine ID" field presents an address of destination engine for this data packet. The value of n−1 least significant bits is known as "Unicast Destination Engine Address" and is shown as "UC Dst. Addr." in FIG. 5. Using the "Unicast Destination Engine Address," an input port will look at its unicast routing table to find out which output port is desired by this data packet.

For a multicast data packet, the value of n−1 least significant bits in the "Destination Engine ID" field presents an identification of a multicast group for this data packet. The value of n−1 least significant bits is known as "Multicast Group ID" and is shown as "MC Group ID" in FIG. 5. Using the "Multicast Group ID," an input port will look at its multicast routing table to find out which output ports are desired by this data packet.

FIG. 6A illustrates an exemplary configurable unicast routing table 600 in an on-chip router according to an embodiment of the present invention. In the example illustrated in FIG. 6A, the "UC Dst. Addr" is 5-bit wide, with values ranging from 0 to 31. The routing table 600 lists the desired output port ID for each unicast destination address. Assume an on-chip router has 8 output ports. As shown in FIG. 6A, a data packet with unicast destination address 0 will go to output port 3, a data packet with unicast destination address 1 will go to output port 0, and so on.

FIG. 6B illustrates an exemplary configurable multicast routing table 650 in an on-chip router according to an embodiment of the present invention. In the example illustrated in FIG. 6B, the "MC Group ID" is 5-bit wide, with values ranging from 0 to 31. The routing table 650 lists the desired output port mask for each multicast group ID. The output port mask is an 8-bit vector, wherein each bit presents an output port. A data packet is copied and sent to all the output ports corresponding to the bits set in the output port mask for a multicast group ID. Assume an on-chip router has 8 output ports. As shown in FIG. 6B, a data packet with multicast group ID 0 will be copied and sent to output ports 3 and 5 (because output port mask is 00101000), a data packet with multicast group ID 1 will be copied and sent to output port 0, 1, 2 and 3 (because output port mask is 00001111), and so on.

In multicast routing, multiple bits are typically set in an output port mask for each multicast group ID. However, it is possible that only one bit can be set in an output port mask. In this case, such a multicast data packet is processed similarly as a unicast data packet. Put differently, this unicast routing is a special case of multicast routing.

All routing tables 600, 650 are reconfigurable by software. Each input port can have its own unicast and multicast routing tables. Alternatively, all input ports can share a single unicast table and/or a single multicast table. However, it should be appreciated that although private routing tables provide higher flexibility, private routing tables have higher silicon area. It should likewise be appreciated that although shared routing tables require less silicon area, shared routing tables limit flexibility.

Figure 7:
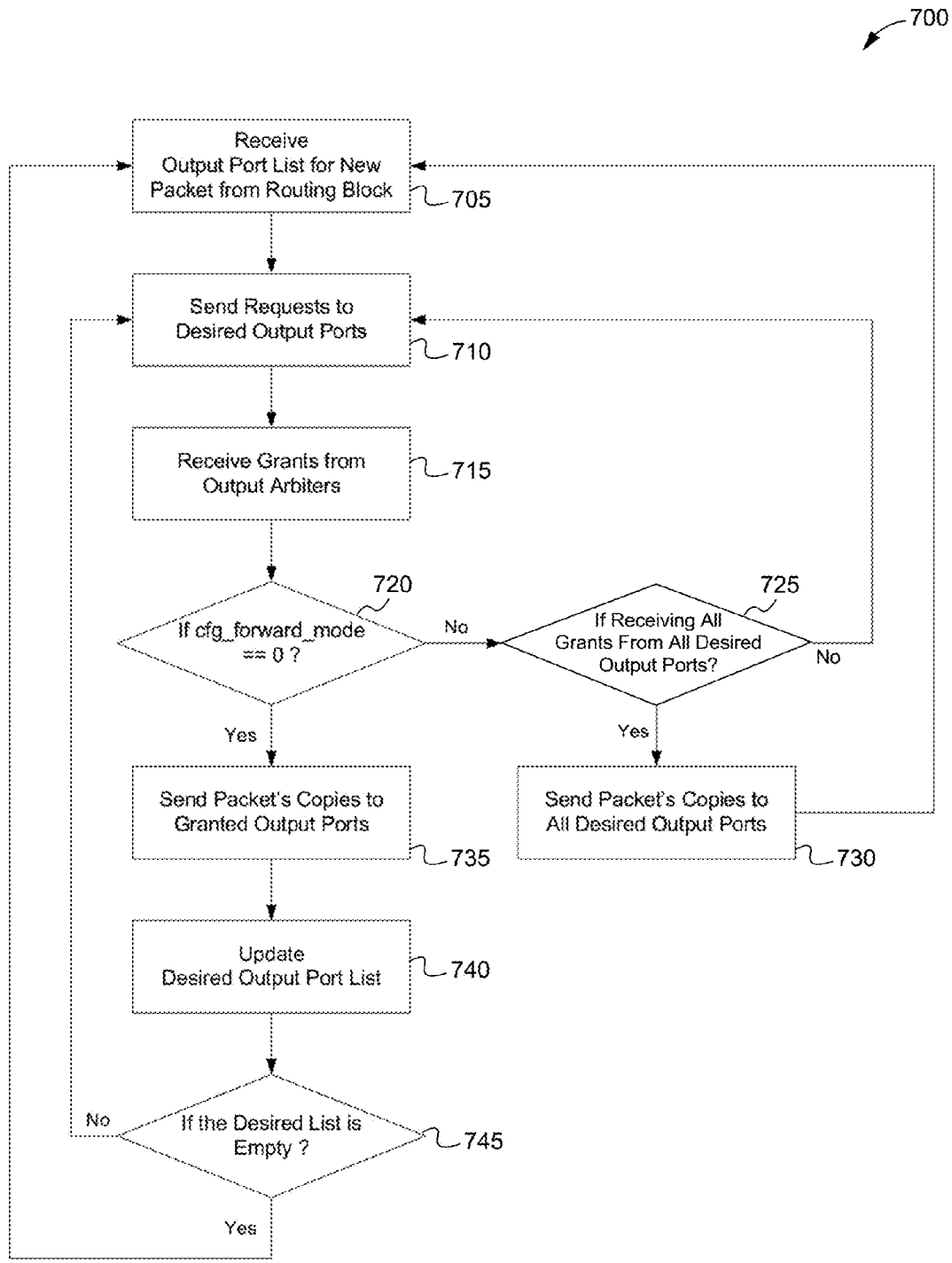
FIG. 7 illustrates a method of data packet forwarding control at each input port of an on-chip router according to an embodiment of the present invention.

FIG. 7 illustrates a method 700 of data packet forwarding control at each input port of an on-chip router according to an embodiment of the present invention. In some embodiments, the method 700 is implemented by the forwarding control 415 in FIG. 4. The method 700 begins at a step 705. At the step 705, a desired output port list for a new data packet is received from a routing block.

After the input port knows the desired output port(s) of the new data packet, at a step 710, query requests are sent to the desired output port(s).

At a step 715, grant(s) is/are received from the output port arbiter(s) of the output port(s). The input port typically waits to receive grant(s) before forwarding the data packet to output port(s). For a unicast data packet, there is only one desired output port. As such, after receiving the grant, the data packet will be sent to that output port. For a multicast data packet, there are typically multiple desired output ports. As such, the input port will send multiple query requests one to each of the desired output ports. For each grant received from an output port, the data packet is copied and is sent to that output port. In some embodiments, two forwarding modes are provided. The mode selection is configurable by software through setting the register named cfg_forward_mode:

If cfg_forward_mode is set to 0, then a copy of the data packet is sent after receiving a grant from an output port, even if the input port has not heard from other desired output port(s). The input port resends query requests to the remaining desired output port(s) in the next cycle. The process is repeated until copies of the multicast data packet are forwarded to all desired output ports.

If cfg_forward_mode is set to 1, then the input port waits to receive all grants from all desired output ports before sending copies of the multicast data packet to all of the desired output ports at the same time.

The cfg_forward_mode register can be set to 0 in applications where throughout is important but not the order of data packets in which they are received. It is noted that order of data packet delivery cannot be guaranteed in such an instance because data packets are sent out as soon as grants are received at an input port.

However, in some applications, the sequence in which data packets are received at a PE is important to ensure that the PE receives the correct data packets for processing. If data packets are sent out as soon as input ports receive grants from output ports, then it is possible for a PE to receive data packets out of order. As such, the cfg_forward_mode register can be set to 1 when the order of data packets in which they are sent is important. In such an instance, an input port waits to receive all grants from all output ports before sending copies of the data packet at the same time to guarantee delivery order. A deadlock results when two or more competing actions are each waiting for its turn to proceed (e.g., two input ports each waiting to receive all grants). However, as discussed in detail below, an arbitration scheme implemented by each on-chip router can advantageously avoid deadlocks. Briefly, output ports of an on-chip router work together to send grants to a single input port at the same time such that that an input port gets all grants in a cycle in order to proceed.

Returning to FIG. 7, at a step 720, it is determined whether cfg_forward_mode is set to 0. If it is determined at the step 720 that cfg_forward_mode is set to 1, then at a step 725, it is determined whether all grants are received from all desired output ports. The process 700 returns to the step 710 if all grants have not yet been received from all desired output ports. Otherwise, at a step 730, copies of the data packet are sent to all desired output ports. After the step 730, the process 700 returns to the step 705.

If it is determined at the step 720 that cfg_forward_mode is set to 0, then at a step 735, copy(ies) of the data packet is/are sent to the granted output port(s) upon receiving grant(s) from those output port(s).

At a step 740, the desired output port list is updated. If it is determined that the Desired Output Port List is empty at a step 745, then the process 700 returns to the step 705. Otherwise, the process returns to the step 710, where query requests are sent out to the (remaining) desired output ports.

As mentioned above, unicast routing is actually a special case of multicast routing in which there is only one desired output port per data packet. Therefore, the data packet forwarding method described in FIG. 7 supports both unicast and multicast data packets.

Figure 8:
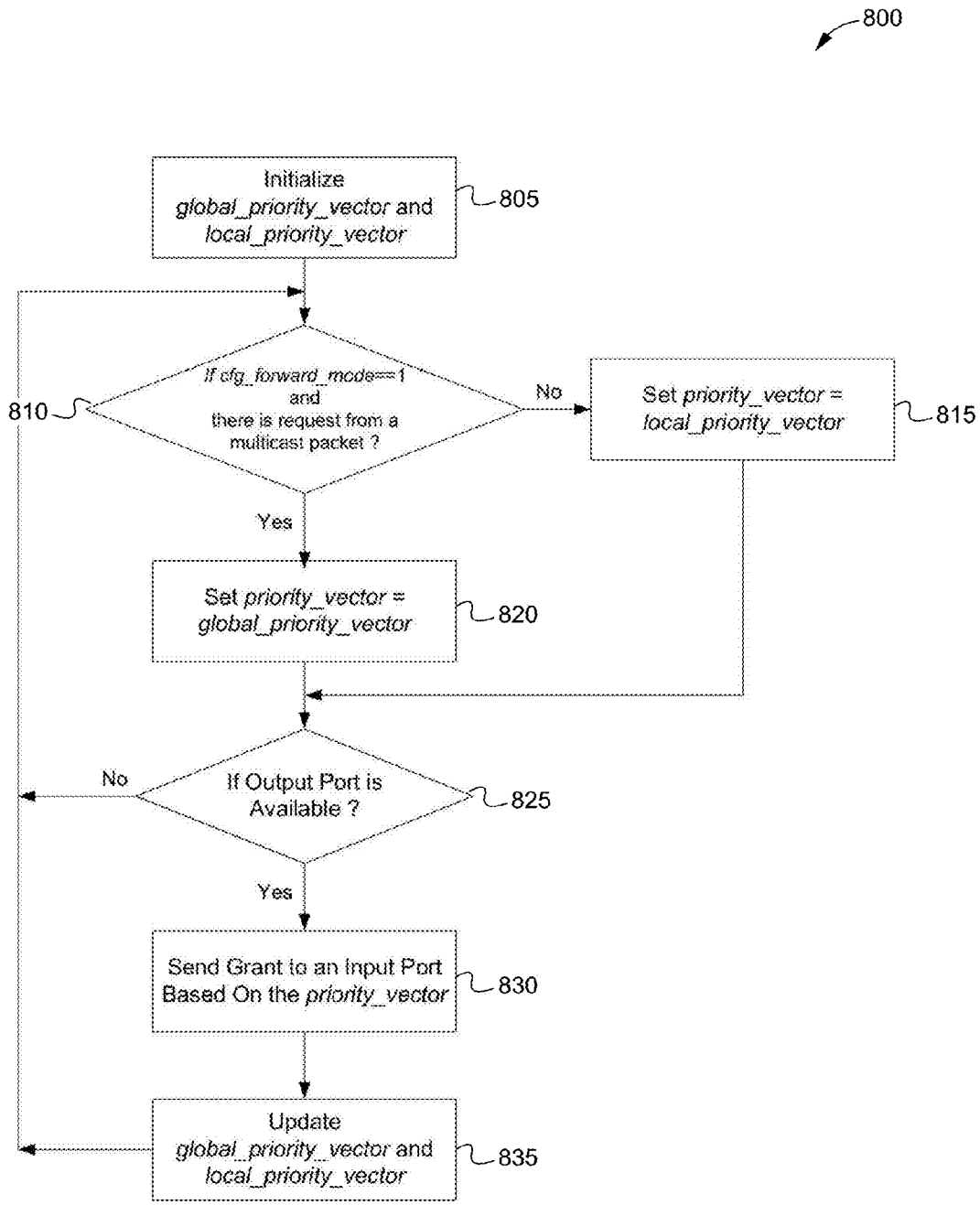
FIG. 8 illustrates an arbitration method at each output port of an on-chip router according to an embodiment of the present invention.

FIG. 8 illustrates an arbitration method 800 at each output port of an on-chip router according to an embodiment of the present invention. The method 800 is performed at an arbitration block of an output port for handling query requests from multiple input ports. Each output port maintains its own variable named local_priority_vector and its own variable named priority_vector. All the output ports share the same variable named global_priority_vector. The bit width of these vectors is equal to the number of input ports. Each of these priority_vectors has one and only one bit set to 1. The position of bit '1' in each vector indicates the corresponding input port gets highest priority to get granted. The local_priority_vector variable in each output port arbiter is used to give grant to unicast data packets which want to go to this output port. The global_priority_vector variable is used by all output port arbiters to give grant to multicast data packets for avoiding deadlocks. The priority_vector vector is used by the output port arbiter to grant one of the query requests to that output port.

At a step 805, the local_priority_vector variable of each output port arbiter and the shared global_priority_vector variable are initialized to give the highest priority to favorite input ports. In some embodiments, the step 805 is performed in a beginning such as at reset time. The initialized values for these vectors are reconfigurable by software. As such, it is possible that all output ports can have different initialized local_priority_vectors depending on which input port an output port would like to give the highest priority in the beginning.

At a step 810, it is determined whether there is any query request from a multicast data packet and whether the cfg_forward_mode register is 1. If it determined at the step 810 that there is a query request from a multicast data packet and that the cfg_forward_mode register is 1, then at a step 820, its priority_vector variable is set to the value of the global_priority_vector variable. With this setting, if a multicast data packet gets granted by an output port arbiter, it is guaranteed to get granted from all its desired output port arbiters. This is because the global_priority_vector is shared by all output port arbiters. This design guarantees no deadlock among different multicast data packets.

If it is determined at the step 810 that the cfg_forward_mode register is 0 or the output port arbiter receives no query request from any multicast data packets, then at a step 815, its priority_vector variable is set to the value of its local_priority_vector variable.

At a step 825, it is determined if an output port is available. If the output port is not available, then the method 800 returns to the step 810. Otherwise, after assigning a value for the priority_vector variable, at a step 830, the output port arbiter sends a grant to one of received query requests once its corresponding output port is available. Typically, an output port is available if the downstream on-chip router or the engine which connects to this port is ready to accept a new data packet.

In some embodiments, the granting algorithm is based on the value of priority_vector as follows: assume the number of input ports is M, the priority_vector has M bits, one bit presents the priority of an input port. The priority_vector has one and only one bit that is set to 1. Assume the bit '1' is at the bit position i counting from right to left. The priority order is given to query requests from input ports i, i+1, i+2, . . . , M−1, 0, . . . i−1 in the decreasing order. If the output port arbiter receives only one query request, then that query request gets granted. If the output port arbiter receives multiple query requests, then the grant is given to the query request which has highest priority among all query requests. Put differently, if the output port arbiter receives a query request from input port i, then that query request gets granted. If the output port arbiter receives one or more query request from input ports other than input port i, then the grant is given to the input port with the highest priority.

After the granting process done, at a step 835, the shared global_priority_vector variable and the local_priority_vector variables of all output port arbiters are updated.

The global_priority_vector variable is updated as follows: if cfg_forward_mode is 0 or there is no input port getting grant, then global_priority_vector does not change. Otherwise, assuming the current global_priority_vector variable has bit '1' at position i, then input ports are checked in the order i, i+1, . . . M, 0, . . . , i−1 to see which is the first one in these input ports gets granted for all its query requests from all its desired output ports. Assuming the first input port matching this check is input port j, then the bit j+1 in the global_priority_vector variable is set to 1, and all other bits are set to 0. This means now the input port j+1 has highest priority, and input port j has lowest priority for next multicast query requests to all output port arbiters.

The local_priority_vector variable of each output port arbiter is updated as follows: if the output port arbiter receives any query request from a multicast data packet or no grant is sent (because there is no query request or the output port is not available), then local_priority_vector variable does not change. Otherwise, assuming it gives grant to input port k, then the bit k+1 in the local_priority_vector variable is set to 1, and all other bits are set to 0. This means now the input port k+1 has highest priority, and input port k has lowest priority for next query request to this output port arbiter.

After the step 825, the method 800 returns to the step 810.

The arbitration and priority updating processing described above guarantees fairness because each input port always has a chance to get granted. If an input port gets granted this time, it will have lowest priority to get granted the next time. In addition, the proposed arbitration also guarantees no deadlock among multicast data packets in both two forwarding modes.

Figure 9:
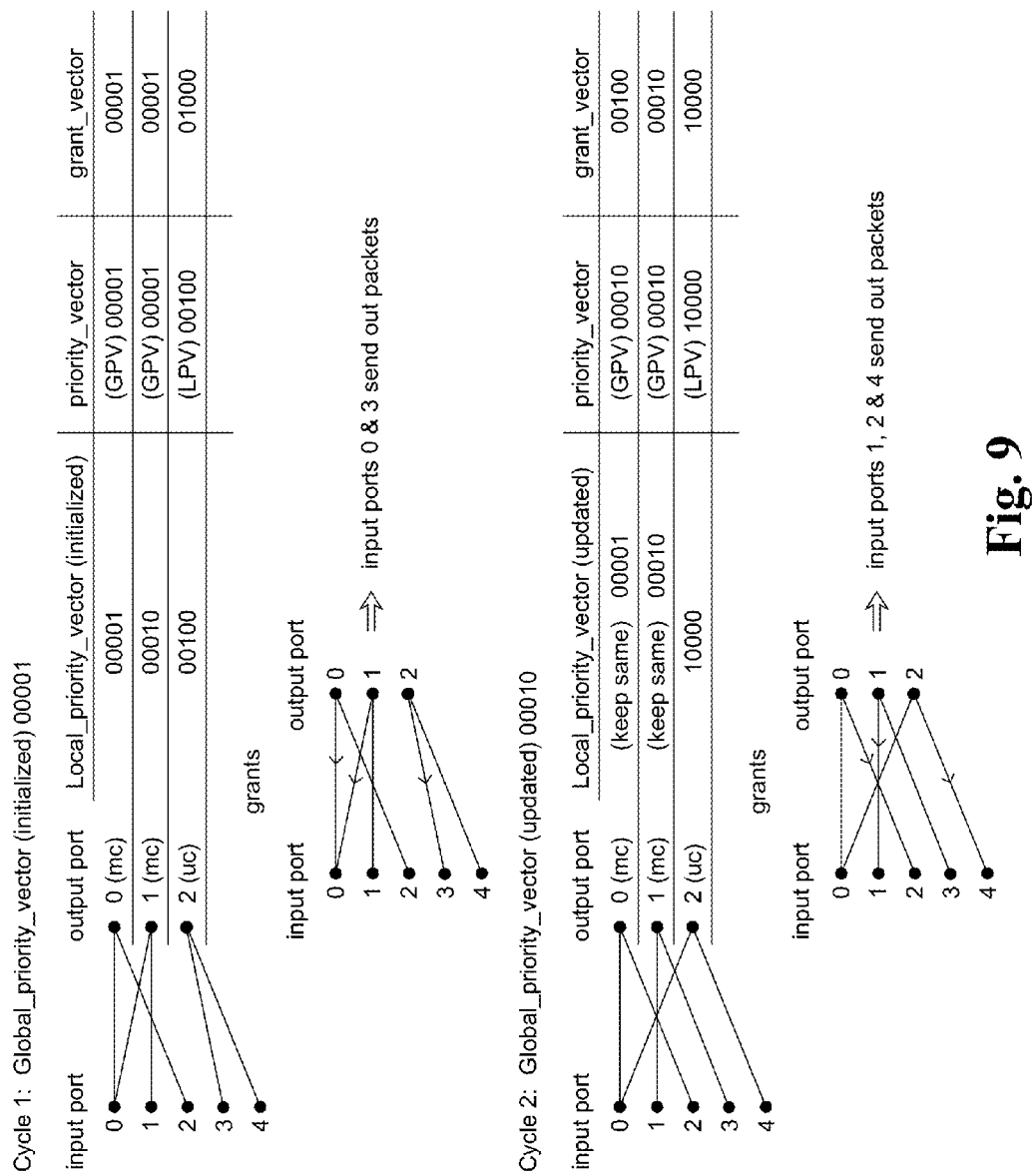
FIG. 9 illustrates an exemplary use case according to an embodiment of the present invention.

FIG. 9 illustrates an exemplary use case according to an embodiment of the present invention. The use case illustrates the first two cycles in data packet routing by an on-chip router. Assume the on-chip router has 5 input ports and 3 output ports and cfg_forward_mode register is set to 1, meaning that each input port must wait to receive all grants from all desired output ports before sending copies of a multicast data packet to all of the desired output ports at the same time. Also assume in Cycle 1 of the on-chip router, Input Port 0 desires to send a multicast message to Output Port 0 and Output Port 1, and each of Input Ports 1-4 desire to send a unicast message to Output Ports 1, 0, 2 and 2, respectively. Each output port has its own local_priority_vector variable and its own priority_vector variable. The output ports share the same global_priority_vector variable. The local_priority_vector variable of each output port arbiter and the shared global_priority_vector variable are first initialized to give the highest priority to favorite input ports. As shown in FIG. 9, the shared global_priority_vector is initialized to 00001 (Input Port 0), the local_priority_vector variable used by the output port arbiter at Output Port 0 is initialized to 00001 (Input Port 0), the local_priority_vector variable used by the output port arbiter at Output Port 1 is initialized to 00010 (Input Port 1), and the local_priority_vector variable used by the output port arbiter at Output Port 2 is initialized to 00100 (Input Port 2).

The priority_vector for Output Port 0 is set to the value of the global_priority_vector (e.g., 00001, which is Input Port 0) because Output Port 0 has received at least one query request for a multicast message. Similarly, the priority_vector for Output Port 1 is set to the value of the global_priority_vector (e.g., 00001, which is Input Port 0) because Output Port 1 has received at least one query request for a multicast message. The priority_vector for Output Port 2 is set to the value of its local_priority_vector (e.g., 00100, which is Input Port 2) because Output Port 2 has only received query requests for unicast messages.

Based on the priority_vector values in Cycle 1, Output Port 0 will provide a grant to Input Port 0 since it has received a query request from Input Port 0 which is currently given the highest priority, Output Port 1 will provide a grant to Input Port 0 since it has received a query request from Input Port 0 which is currently given the highest priority, and Output Port 2 will provide a grant to Input Port 3 because it has received a query request from Input Port 3 which is given the next highest priority after Input Port 2. Accordingly, Input Ports 0 and 3 send out data packets to the desired output ports.

In the next cycle, Cycle 2, Input Ports 1, 2 and 4 try again in their query requests, resending query requests to Output Ports 1, 0 and 2, respectively, since the previous query requests in Cycle 1 were not granted. In Cycle 2, Input Port 0 now desires to send a multicast message to Output Port 0 and Output Port 2, and Input Port 3 desires to send a unicast message to Output Port 1. The shared global_priority_vector variable is updated to the next priority port, which is 00010. The value of the local_priority_vector variable for Output Port 0 remains the (i.e., 00001, which is Input Port 0) because Output Port 0 did receive a query request from a multicast message in the previous cycle. Similarly, the value of the local_priority_vector variable for Output Port 1 remains the same (i.e., 00010, which is Input Port 1) because Output Port 1 did receive a query request from a multicast message in the previous cycle. However, the value of the local_priority_vector variable for Output 2 is updated to from 00100 to 10000 (Input Port 4) because Output Port 2 received a query request from a unicast message and a grant was sent to Input Port 3 in the previous cycle.

Based on the priority_vector values in Cycle 2, Output Port 0 will provide a grant to Input Port 2 because it has received a query request from Input Port 2 which is given the next highest priority after Input Port 1, Output Port 1 will provide a grant to Input Port 1 since it has received a query request from Input Port 1 which is currently given the highest priority, and Output Port 2 will provide a grant to Input Port 4 since it has received a query request from Input Port 4 which is currently given the highest priority. Accordingly, Input Ports 1, 2 and 4 send out data packets to the desired output ports.

In the next cycle, Cycle 3, Input Ports 0 and 3 try again in their query requests, resending query requests to Output Ports 0 and 1, respectively. Input ports that are to receive grants from the output ports in each subsequent cycle are determined accordingly.

Figure 10:
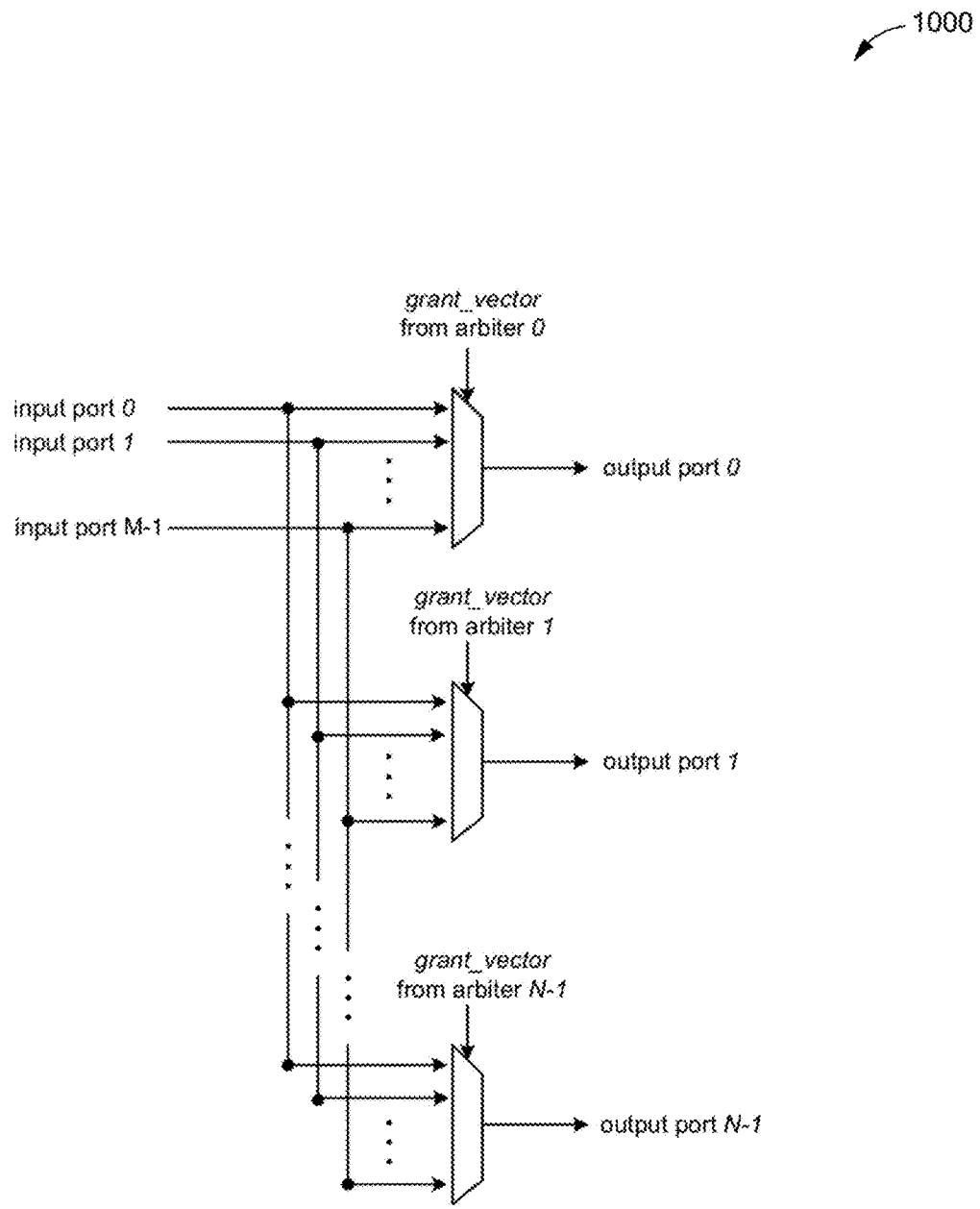
FIG. 10 illustrates a schematic of a crossbar in an on-chip router according to an embodiment of the present invention.

After output port arbiters send their grants to input ports, they also setup the crossbar for connecting the granted input ports to their correct output ports. The crossbar logic is shown in FIG. 10. The crossbar is actually a set of N multiplexors where N is the number of on-chip router output ports. Each multiplexor has M inputs where M is the number of on-chip router input ports. Each multiplexor is controlled by the grant signal by the corresponding output port arbiter. For example, if the output port arbiter n sends grant to input port m, the multiplexor n is set up to the data packet from input port m is sent to output port n.

Each multiple-input multiplexor is built from a binary tree of common 2-input multiplexors. Therefore, the number of 2-input multiplexors for a M-input multiplexor is M−1. The latency of a M-input multiplexor is $\log_2(M)$ times of the latency of a 2-input multiplexor.

Embodiments of the present invention relate to a scalable interconnection scheme of multiple processing engines on a single chip using on-chip configurable routers. The interconnection scheme supports unicast and multicast routing of data packets communicated by the processing engines. Each on-chip configurable router includes routing tables that are programmable by software, and is configured to correctly deliver incoming data packets to its output ports in a fair and deadlock-free manner. In particular, each output port of the on-chip configurable routers includes an output port arbiter to avoid deadlocks when there are contentions at output ports of the on-chip configurable routers and to guarantee fairness in delivery among transferred data packets.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A chip comprising a network, wherein the network includes:
a plurality of processing engines; and
a matrix of on-chip routers, wherein each of the on-chip routers is communicatively coupled with a distinct group of the processing engines and with on-chip routers nearest to that on-chip router in the matrix of on-chip routers, and wherein each of the on-chip routers includes a plurality of input ports, a plurality of output ports, and a plurality of an output port arbiters such that there is one of the output arbiters at each of the output ports, wherein each one of the plurality of output port arbiters uses a global grant vector shared by all of the plurality of output port arbiters of that on-chip router and a local grant vector unique to that one of the plurality of output port arbiters to grant a query request from one of the input ports such that the grant of the query request by the one of the plurality of output arbiters is based on both the global grant vector shared by the plurality of output arbiters and the local grant vector associated with the one of the plurality of output arbiters.

2. The chip of claim 1, wherein the plurality of processing engines communicates together through the matrix of on-chip routers.

3. The chip of claim 1, wherein the network is scalable to support additional processing engines.

4. The chip of claim 3, wherein the additional processing engines are coupled with the plurality of on-chip routers.

5. The chip of claim 3, wherein additional on-chip routers are added to the matrix, and the additional processing engines are coupled with the additional on-chip routers.

6. The chip of claim 1, wherein a link connecting two on-chip routers are multiple times wider than a link connecting an on-chip router and a processing engine such that a router-to-router link can transfer multiple data packets in parallel for reducing network congestion.

7. The chip of claim 1, wherein on-chip routers located at an edge of the network are able to connect to components outside the network for simplifying a wiring physical layout of the network.

8. The chip of claim 1, wherein the on-chip routers are configurable by software.

9. An on-chip router comprising:
a plurality of M input ports, wherein each of the M input ports includes:
an input queue for storing incoming data packets received from an upstream on-chip router or a processing engine connecting with that input port;
a routing block for identifying at least one desired output port of a data packet at the head of the input queue; and
a forwarding control block for sending a query request to and receiving a grant from each of the at least one desired output port, and for forwarding the data packet to each of the at least one desired output port;
a plurality of N output ports, wherein each of the plurality of N output ports includes an output port arbiter, each one of the plurality of output port arbiters for:
collecting query requests to the that output port associated with the one of the plurality of output arbiters from at least one of the input ports; and for granting one of the query requests based on a global grant vector shared by all of the plurality of output port arbiters; and
a crossbar for connecting the M input ports and the N outputs, wherein the crossbar is controlled by outcomes of the output port arbiters.

10. An on-chip router comprising:
M input ports, wherein each of the M input ports includes:
an input queue for storing incoming data packets received from an upstream on-chip router or a processing engine connecting with that input port;
a routing block for identifying at least one desired output port of a data packet at the head of the input queue; and
a forwarding control block for sending a query request to and receiving a grant from each of the at least one desired output port, and for forwarding the data packet to each of the at least one desired output port;
N output ports, wherein each of the N output ports includes an output port arbiter for collecting query requests to that output port from at least one of the input ports and for granting one of the query requests based on a global grant vector shared by all of the output port arbiters; and
a crossbar for connecting the M input ports and the N outputs, wherein the crossbar is controlled by outcomes of the output port arbiters, wherein the crossbar includes a set of N of M-input multiplexors where M and N are the number of input and output ports of the on-chip router, respectively, wherein each of the M-input multiplexors is a binary tree of M−1 of common 2-input multiplexors and has a latency of $\log_2(M)$ times of the latency of a 2-input multiplexor.

11. The on-chip router of claim 9, wherein the data packet includes control bits indicating whether the data packet is one of a unicast packet and a multicast packet.

12. The on-chip router of claim 9, further comprising reconfigurable unicast and multicast routing tables for identifying one or more desired output ports of a data packet.

13. The on-chip router of claim 12, wherein each of the M input ports is configured to have its own unicast and multicast routing tables.

14. The on-chip router of claim 12, wherein the M input ports are configured to share the routing tables.

15. The on-chip router of claim 9, wherein the on-chip router implements one of two configurable modes for forwarding multicast data packets from input ports to output ports.

16. The on-chip router of claim 9, wherein the output port arbiter is configured to arbitrate a grant for multiple query requests to that output port for multicast and unicast data packets from one or more of the M input ports.

17. An on-chip router comprising:
M input ports, wherein each of the M input ports includes:
an input queue for storing incoming data packets received from an upstream on-chip router or a processing engine connecting with that input port;
a routing block for identifying at least one desired output port of a data packet at the head of the input queue; and
a forwarding control block for sending a query request to and receiving a grant from each of the at least one desired output port, and for forwarding the data packet to each of the at least one desired output port;
N output ports, wherein each of the N output ports includes an output port arbiter for collecting query requests to that output port from at least one of the input ports and for granting one of the query requests; and
a crossbar for connecting the M input ports and the N outputs, wherein the crossbar is controlled by outcomes of the output port arbiters, wherein the output port arbiter uses:
a global_priority_vector variable that is shared by all output port arbiters, the global_priority_vector variable for allocating a grant among multicast data packets;

a local_priority_vector variable that is maintained by each output port arbiter, the local_priority_vector variable for allocating a grant among unicast data packets; and a priority_vector variable that is also maintained by each output port arbiter, the priority_vector variable is dynamically assigned a value of one of the global_priority_vector and local_priority_vector.

18. The on-chip router of claim 17, wherein value assignment for the priority_vector value of each of the output port arbiters depends on a forwarding mode and whether that output port arbiter has received a query request from any multicast data packet.

19. The on-chip router of claim 17, wherein each output port arbiter gives grant to only one of the query requests based on the corresponding priority_vector value.

20. An on-chip router comprising:
M input ports, wherein each of the M input ports includes:
an input queue for storing incoming data packets received from an upstream on-chip router or a processing engine connecting with that input port;
a routing block for identifying at least one desired output port of a data packet at the head of the input queue; and
a forwarding control block for sending a query request to and receiving a grant from each of the at least one desired output port, and for forwarding the data packet to each of the at least one desired output port;
N output ports, wherein each of the N output ports includes an output port arbiter for collecting query requests to that output port from at least one of the input ports and for granting one of the query requests; and
a crossbar for connecting the M input ports and the N outputs, wherein the crossbar is controlled by outcomes of the output port arbiters, wherein the output port arbiter uses:
a global_priority_vector variable that is shared by all output port arbiters, the global_priority_vector variable for allocating a grant among multicast data packets;
a local_priority_vector variable that is maintained by each output port arbiter, the local_priority_vector variable for allocating a grant among unicast data packets; and
a priority_vector variable that is also maintained by each output port arbiter, the priority_vector variable is dynamically assigned a value of one of the global_priority_vector and local_priority_vector, wherein the shared global_priority_vector variable and all local_priority_vector variables are updated after each cycle based on granting outcomes.

21. A method implemented on an on-chip router, the method comprising:
initializing a global_priority_vector variable that is shared by all N output port arbiters of the on-chip router to give priority to one of a plurality of input ports, wherein the global_priority_vector variable is for allocating a grant among multicast data packets;
initializing each of N local_priority_vector variables that are maintained by the N output port arbiters to one of the plurality of input ports, wherein each of the N local_priority_vector variables is for allocating a grant among unicast data packets;
determining a forwarding mode;

at each of the N output port arbiters:
determining whether a query request is from a multicast data packet;
based on the determination that the forwarding mode is a first mode or on the determination that the query request is not from a multicast data packet, setting a value of a priority_vector to the value of the local_priority_vector;
based on the determination that the forwarding mode is a second mode and on the determination that the query request is from a multicast data packet, setting a value of a priority_vector to the value of the global_priority_vector; and
upon availability of a corresponding output port, sending grant to an input port based on the priority_vector; and
updating the global_priority_vector variable and the N local_priority_vector variables.

22. The method of claim 21, wherein the global_priority_vector variable is not updated when the forwarding mode is the first mode or there is no input port getting granted.

23. The method of claim 21, wherein the global_priority_vector variable is updated to an input port with the next highest priority when the forwarding mode is the second mode and there is at least one input port getting granted.

24. The method of claim 21, wherein a local_priority_vector variable is not updated when the corresponding output port arbiter receives at least one query request from a multicast data packet or no grant is sent.

25. The method of claim 21, wherein a local_priority_vector variable is updated when the corresponding output port arbiter receives no query requests from any multicast data packet and a grant is sent.

26. The method of claim 21, wherein the first mode is sending a copy upon receiving a grant even if an input port has not heard from all desired output ports, and wherein the second mode is waiting to receive all grants from all desired output ports before sending copies to all of the desired output ports at the same time.

27. A chip comprising a network, wherein the network includes:
a plurality of processing engines; and
a matrix of on-chip routers, wherein each of the on-chip routers is communicatively coupled with a distinct group of the processing engines and with on-chip routers nearest to that on-chip router in the matrix of on-chip routers, and wherein each of the on-chip routers includes input ports, output ports, and an output port arbiter at each of the output ports, wherein the output port arbiter uses a global grant vector shared by all output port arbiters of that on-chip router and a local grant vector unique to that output port arbiter to grant a query request from one of the input ports, wherein values of the global grant vector and values of the local grant vectors are updated after each cycle based on granting outcomes such that each of the input ports whose query request was granted in a previous cycle has the lowest priority for receiving a grant in a next cycle.

* * * * *